United States Patent Office 3,425,868
Patented Feb. 4, 1969

3,425,868
MANUFACTURE OF DEXTRIN
Robert E. Lanphere, Camanche, Iowa, assignor to Standard Brands Incorporated, New York, N.Y., a corporation of Delaware
No Drawing. Filed Mar. 23, 1966, Ser. No. 536,666
U.S. Cl. 127—38                                9 Claims
Int. Cl. C08b 25/02

This invention relates to dextrins and a process for preparing the same.

An object of the invention is an improved process for the production of dextrins.

Another object of the invention is an improved process for the production of dextrins which are light in color and have high solubility in water and low viscosity.

A further object of the invention is an improved process for preparing canary dextrins.

Dextrins are commonly prepared by roasting common starch with an acid, such as hydrochloric acid, as a catalyst. This process requires a long period of heating at a relatively high temperature.

In accordance with the invention, it has been found that if starch of low moisture content, or such starch acidified with an acid, for instance, hydrochloric acid, is blended with a small amount of boric acid ($H_3BO_3$) and roasted, dextrins can be obtained at a lower temperature and in a shorter time than that required in the aforesaid prior art process employing hydrochloric acid as a catalyst. Moreover the resulting product exhibits improved tack compared to conventional dextrins having similar viscosity and degree of water solubility.

In accordance with the invention, the acidified or non-acidified starch having a moisture content not greater than about 7.6% preferably about 1 to 4% when using hydroxyethyl starch, or about 5.5 to 7.5% when using common corn starch, is blended with about 1 to 5%, preferably about 4%, of boric acid and the mixture is roasted at a dextrinizing temperature until a product of the desired properties is obtained.

The starch may be derived from any course and it may be employed in the unmodified or in a modified state. Its pH may be the natural pH or it may be acidified.

The dextrinizing temperature will vary depending upon the nature of the starch and the roasting time. In the case of common unmodified starch, temperatures up to about 340° F. may be used. In the case of hydroxyethyl starch containing about 10 hydroxyethyl groups per 100 anhydroglucose units, the temperature may be from about 235 to 280° F. and preferably about 260° F. Roasting time depends upon the color, solubility and viscosity sought in the product. The higher the roasting temperature, the shorter the roasting time.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

The hydroxyethyl starch employed in the examples was prepared by treating corn starch with ethylene oxide in accordance with the process described in U.S. Patent No. 2,516,633 and contained 10 hydroxyethyl groups per 100 anhydroglucose units. Water solubility was determined at 25° C. and viscosity was measured by the method described in the article entitled "Viscometer For Dextrin Pastes" by Fetzer et al., Analytical Chemistry, vol. 24, page 1671 (October 1952), using a paste prepared from 160 grams of dextrin, 24 grams of borax and 244 grams of water except in the case of Examples 10 and 11 in which case the paste contained 280 grams rather than 244 grams of water. Moisture contents of all samples were determined in an oven heated to 130° C. This heat was sufficient to drive off enough water from the boric acid to increase the (apparent) overall moisture content of the starch-boric acid mixtures by approximately 1.1%.

EXAMPLE 1

This example illustrates a prior art process for making dextrin from hydroxyethyl starch having a relatively high moisture content using hydrochloric acid as a catalyst.

Twenty-two pounds of powdered hydroxyethyl corn starch was acidified to a pH of 3.12 by aspirating 13 ml. of 20° Bé. hydrochloric acid plus a small quantity of water into the starch in a ribbon blender, thus raising the moisture content of the starch to 12.0%. The acidified starch was transferred to a pilot plant size conventional dextrin roaster and heated to a temperature of 260° F. The starch was roasted at this temperature for five hours and then allowed to cool to room temperature. The dextrin thus obtained had a water solubility of only 16.7% and its viscosity was so high that it would not flow.

EXAMPLE 2

This example illustrates the preparation of dextrin in accordance with the invention from hydroxyethyl starch having a low moisture content and using boric acid as a catalyst.

Twenty-two pounds of powdered hydroxyethyl corn starch having a pH of 5.80 and a moisture content of 9.3% was placed in a pilot plant size conventional dextrin roaster. The starch was heated to 260° F. and was held at this temperature for 1¼ hours. Thus, the moisture content of the starch was reduced to 1.6%. It had a water solubility of 1.8%. Four hundred and twelve grams of powdered boric acid was mixed with the starch in the roaster; the mixture was roasted at 260° F. for 15 minutes and was then allowed to cool to room temperature. The canary dextrin thus obtained had a water solubility of 97.7%, its color was still almost white and its viscosity was 59 seconds.

EXAMPLE 3

This example illustrates the preparation of canary dextrin in accordance with the invention from acidified hydroxyethyl starch of low moisture content using boric acid as a catalyst.

Twenty-two pounds of powdered hydroxyethyl corn starch was acidified to a pH of 3.0 by aspirating 12.8 ml. of 20° Bé. hydrochloric acid plus a small quantity of water into the starch in a ribbon blender. The moisture content of the starch was 10.4%. The acidified starch was transferred to a pilot plant size conventional dextrin roaster and was heated to 260° F. and maintained at this temperature until the moisture content was reduced to 1.6%. The dried starch had a water solubility of 10.0%. Four hundred and twelve grams of powdered boric acid was added to the starch and the mixture was maintained at 260° F. for 35 minutes. The product was allowed to cool to room temperature. It had a water solubility of 95.6%, its color was almost white and its viscosity was 38 seconds.

EXAMPLE 4

This example and Examples 5 to 9 describe the dextrinization of hydroxyethyl starch using boric acid as a catalyst and illustrate the effect of varying the moisture content of such starch and the roasting temperature.

In Examples 4 to 9 periodic 4 oz. samples were taken throughout the roast. These samples were cooled immediately on open trays to stop the reaction. Water solubility and pH were determined on each sample. Small samples (about 5 grams) were also taken at predetermined intervals. These samples were kept sealed in covered moisture pans for immediate moisture determination. These can be considered representative of the moisture content of the roast at the specified times and are referred to in this manner in the tables (Rep. for Representative). Moisture content of the cooled samples was also determined in order to find water solubility of those samples on a dry substance basis.

Twenty-two pounds of powdered hydroxyethyl starch having a pH of 5.61 and a moisture content of 6.47% was blended with 4% by weight of powdered boric acid and then roasted in a small dextrin roaster according to the time-temperature cycle given in the table below. The final product was a satisfactory canary dextrin having a viscosity of 35 seconds.

| Total roasting time, (hr.) | Starch temperature (°F.) | Rep. moist., percent | Cooled moist., percent | Cold water solubility, percent |
|---|---|---|---|---|
| 1 | 175 | 6.8 | | |
| 2 | 175 | 5.9 | | |
| 3 | 175 | 5.3 | | |
| 4 | 175 | 4.8 | | |
| 4½ | 190 | 4.7 | | |
| 4¾ | 205 | 4.5 | | |
| 5 | 220 | 4.2 | 4.3 | 9.7 |
| 5¼ | 235 | 3.8 | 4.2 | 27.7 |
| 5½ | 250 | 3.2 | 3.5 | 90.6 |
| 5¾ | 259 | 2.4 | 2.6 | 99.2 |
| 6 | 258 | 2.0 | 2.0 | 99.0 |

EXAMPLE 5

Twenty-two pounds of powdered hydroxyethyl starch having a moisture content of 11.3% and a pH of 5.62 was roasted in a small dextrin roaster according to the time-temperature cycle given in the table below. At the end of two and one-half hours when the moisture content was estimated to be between 1 and 2%, there was added to the starch in the roaster 4% by weight of boric acid. A satisfactory canary dextrin was obtained having a viscosity of 33 seconds.

| Total roasting time, (hr.) | Starch temperature (°F.) | Rep. moist., percent | Cooled moist., percent | Cold water solubility, percent |
|---|---|---|---|---|
| 20 minutes | 175 | 10.3 | | |
| 30 minutes | 210 | 9.0 | | |
| 36 minutes | 225 | 8.1 | | |
| 45 minutes | 250 | 6.4 | | |
| 1 hr | 260 | 4.9 | | |
| 1¼ hr | 260 | 3.6 | | |
| 1½ hr | 260 | 3.0 | | |
| 1¾ hr | 260 | 2.4 | 3.3 | 4.9 |
| 2 hr | 260 | 1.8 | 3.5 | 4.9 |
| 2¼ hr | 260 | 1.5 | 2.6 | 4.9 |
| 2½ hr | 260 | 1.3 | 2.6 | 4.9 |
| 2¾ hr | 263 | 2.4 | 3.2 | 99.0 |

EXAMPLE 6

Powdered hydroxyethyl starch having a pH of 5.74 and a moisture content of 7.7% was blended with 4% by weight of boric acid and roasted in a small dextrin roaster according to the time-temperature cycle given in the table below. Except for a light color development at 325° F. the starch remained unchanged in appearance throughout the roasting. It was almost impossible to get the samples into solution for water solubility determinations. The viscosity of the final product could not be determined because the paste made from it was too thick.

| Total roasting time, (hr.) | Starch temperature (°F.) | Rep. moist., percent | Cooled moist., percent | Cold water solubility, percent |
|---|---|---|---|---|
| 1 | 175 | 8.4 | | |
| 2 | 175 | 7.3 | | |
| 3 | 175 | 6.1 | | |
| 4 | 180 | 5.1 | | |
| 4½ | 190 | 5.0 | 5.7 | 11.3 |
| 4¾ | 205 | 4.5 | 5.5 | 11.9 |
| 5 | 217 | 4.1 | 4.8 | 12.8 |
| 5¼ | 232 | 3.7 | 4.6 | 14.9 |
| 5½ | 245 | 3.3 | 4.0 | 16.8 |
| 5¾ | 260 | 2.5 | 3.8 | 21.5 |
| 6 | 275 | 2.0 | 3.2 | 25.9 |
| 6¼ | 290 | 1.5 | 2.3 | 28.7 |
| 6½ | 307 | 1.2 | 2.6 | 31.6 |
| 6¾ | 320 | 0.8 | 1.9 | 37.2 |
| 7 | 325 | 0.5 | 0.9 | 49.4 |

EXAMPLE 7

Powdered hydroxyethyl starch having a pH of 5.37 and a moisture content of 7.55% was blended with 4% by weight of boric acid and then roasted in a small dextrin roaster according to the time-temperature cycle given in the table below. The final product was a satisfactory canary dextrin having a viscosity of 44 seconds.

| Total roasting time, (hr.) | Starch temperature (°F.) | Rep. moist., percent | Cooled moist., percent | Cold water solubility, percent |
|---|---|---|---|---|
| 1 hr | 175 | 8.07 | | |
| 2 hr | 175 | 7.13 | | |
| 3 hr | 175 | 6.36 | | |
| 4 hr | 175 | 5.85 | 6.0 | 6.1 |
| 4 hr. 25 min | 190 | 5.51 | 5.7 | 6.2 |
| 4¾ hr | 205 | 5.15 | 5.4 | 6.4 |
| 5 hr | 220 | 4.76 | 5.0 | 6.7 |
| 5¼ hr | 235 | 4.35 | 4.5 | 12.6 |
| 5½ hr | 250 | 3.70 | 4.1 | 36.2 |
| 5¾ hr | 263 | 2.99 | 3.0 | 76.8 |
| 5 hr. 55 min | 275 | 2.36 | 2.5 | 90.4 |
| 6 hr. 10 min | 287 | 1.96 | 2.3 | 96.4 |

EXAMPLE 8

Powdered hydroxyethyl starch having a pH of 5.30 and a moisture content of 7.8% was blended with 4% by weight of boric acid and then roasted in a small dextrin roaster according to the time-temperature cycle given in the table below. The final product was still white, was soluble in cold water only to the extent of 24.1%. When made into a paste, viscosity could not be determined because the paste was too thick.

| Total roasting time, (hr.) | Starch temperature (°F.) | Rep. moist., percent | Cooled moist., percent | Cold water solubility, percent |
|---|---|---|---|---|
| 1 | 175 | 8.80 | | |
| 2 | 175 | 7.31 | | |
| 3 | 175 | 6.21 | | |
| 4 | 175 | 5.56 | 5.8 | 5.9 |
| 4½ | 190 | 5.09 | 5.3 | 6.0 |
| 4¾ | 205 | 4.78 | 4.7 | 6.1 |
| 5 | 220 | 4.17 | 4.8 | 6.4 |
| 5¼ | 235 | 3.69 | 4.0 | 6.7 |
| 5½ | 250 | 3.20 | 3.7 | 7.2 |
| 5¾ | 260 | 2.60 | 3.2 | 8.0 |
| 6 | 275 | 2.10 | 2.4 | 9.2 |
| 6¼ | 290 | 1.58 | 2.2 | 11.5 |
| 6½ | 310 | 1.12 | 1.8 | 14.4 |
| 6¾ | 320 | 0.68 | 1.7 | 19.0 |
| 7 | 327 | 0.43 | 2.9 | 24.1 |

EXAMPLE 9

Powdered hydroxyethyl starch having a pH of 5.24 and a moisture content of 10.9% was roasted in a small dextrin roaster according to the time-temperature cycle given in the table below, 4% by weight of boric acid being added after two hours heating when the moisture content of the starch was 6.78% and its temperature was 175° F. The final product was a satisfactory canary dextrin having a viscosity of 33 seconds.

| Total roasting time, (hr.) | Starch temperature (° F.) | Rep. moist., percent | Cooled moist., percent | Cold water solubility, percent |
|---|---|---|---|---|
| 1 hr | 175 | 8.46 | | |
| 2 hr | 175 | 6.78 | 6.9 | |
| 3 hr | 175 | 7.21 | 8.0 | |
| 4 hr | 177 | 6.32 | 6.5 | 5.9 |
| 4½ hr | 190 | 5.86 | 5.9 | 5.9 |
| 4¾ hr | 200 | 5.58 | 5.7 | 5.9 |
| 5 hr | 217 | 5.20 | 5.4 | 6.4 |
| 5¼ hr | 233 | 4.70 | 4.6 | 10.2 |
| 5½ hr | 244 | 4.15 | 4.2 | 30.8 |
| 5¾ hr | 254 | 3.36 | 3.6 | 83.5 |
| 5 hr. 57 min | 262 | | 3.1 | 98.4 |

EXAMPLE 10

This example illustrates the preparation of dextrin in accordance with the invention from unmodified corn starch having a low moisture content and using a mixture of boric acid and hydrochloric acid as a catalyst.

Twenty pounds of powdered common corn starch having a pH of 6.0 and a moisture content of 7.3% was blended with 375 grams of boric acid and 4.8 ml. of 20° Baumé hydrochloric acid, diluted with 20 ml. of water, was aspirated into this mixture. The mixture was heated in a small dextrin roaster to 200° F. in one hour, held at 200° F. for two hours, gradually heated to 325° F. during the next three hours and maintained at this temperature for twenty minutes. The product was then taken from the roaster and cooled. While roasting, a considerable amount of draft was applied above the starch in the roaster to facilitate rapid moisture removal. The finished product was light in color, had a water solubility of 99.5% and a viscosity of 38 seconds. The product was very easily peptized with cold water. In fact, it dispersed in cold water almost as readily as common corn starch.

EXAMPLE 11

This example illustrates a prior art process for making dextrin from unmodified corn starch having a relatively high moisture content using hydrochloric acid as a catalyst.

Twenty pounds of powdered common corn starch having a pH of 5.12 and a moisture content of 8.5% was placed in a ribbon-type blender and then 1.4 ml. of 20.7° Baumé hydrochloric acid, diluted with 35 ml. of water, was aspirated into the starch. The mixture was then heated at the temperature and for the times indicated in Example 10. A sample was taken from the roaster and cooled after six hours and twenty minutes of roasting. This is the total roasting time indicated in Example 10. The balance of the mixture in the roaster was held at 325° F. for an additional one hour and forty minutes before being removed and cooled. The sample taken after six hours and twenty minutes roasting time had a water solubility of only 0.8% and a paste viscosity which was too high to measure. The finished product obtained after additional roasting had a water solubility of only 1.6% and a paste viscosity which was too high to measure.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. Process for preparing dextrin which comprises blending a small amount of boric acid with starch having a moisture content not greater than about 7.6% by weight and roasting the mixture at a dextrinizing temperature until a dextrin is obtained.

2. Process as defined in claim 1 wherein the amount of boric acid is equal to about 1 to 4% by weight of the starch.

3. Process as defined in claim 1 wherein the roasting time and temperature are such as to produce a canary dextrin.

4. Process as defined in claim 1 wherein the starch has a moisture content of about 1 to 4% by weight.

5. Process as defined in claim 4 wherein the amount of boric acid is equal to about 1 to 4% by weight of the starch.

6. Process as defined in claim 1 wherein the starch is an hydroxyethyl starch having about 10 hydroxyethyl groups per 100 anhydroglucose units and the dextrinizing temperature is about 235 to 280° F.

7. Process as defined in claim 6 wherein the dextrinizing temperature is about 260° F.

8. Process as defined in claim 1 wherein the starch is unmodified starch.

9. Process as defined in claim 8 wherein the starch is unmodified corn starch.

References Cited

UNITED STATES PATENTS

| | | | |
|---|---|---|---|
| 1,505,696 | 8/1924 | Brindle | 127—38 |
| 1,564,970 | 12/1925 | Long | 127—38 X |
| 2,148,525 | 2/1939 | Bauer et al. | 127—38 |
| 2,563,014 | 8/1951 | Durand | 127—38 |
| 2,994,615 | 8/1961 | McDonald | 106—213 |
| 2,999,031 | 9/1961 | Katzbeck | 106—213 |
| 3,066,036 | 11/1962 | Curtin et al. | 106—213 |
| 3,083,112 | 3/1963 | Evans et al. | 106—213 |
| 3,224,903 | 12/1965 | Commerford et al. | 127—38 |

MORRIS O. WOLK, *Primary Examiner.*

S. MARANTZ, *Assistant Examiner.*

U.S. Cl. X.R.

127—36, 68